Feb. 11, 1930.    W. SASSE    1,746,716
DRILLING TOOL
Filed Sept. 23, 1926
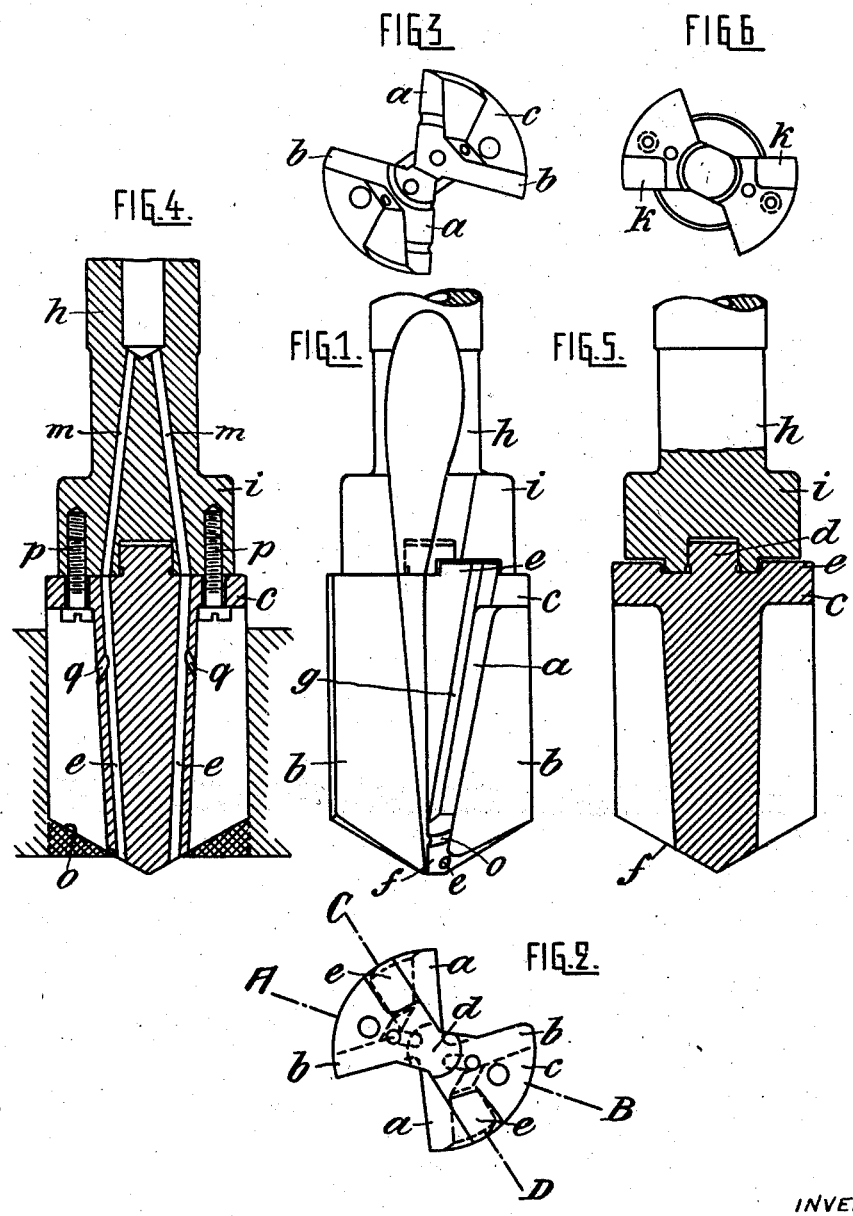
INVENTOR
WILHELM SASSE
BY Richards & Geier
ATTORNEYS Patented Feb. 11, 1930

1,746,716

UNITED STATES PATENT OFFICE

WILHELM SASSE, OF SPANDAU, GERMANY

DRILLING TOOL

Application filed September 23, 1926, Serial No. 137,243, and in Germany September 26, 1925.

Drilling tools, which have so far been in use, have the disadvantage, that the chips or cuttings will very quickly collect in the boring thus clogging up the grooves which serve for carrying off the chips or cuttings. The drilling tool must at intervals be taken out of the boring and cleaned, whereby the drilling of deep holes will be rendered cumbersome and expensive.

According to this invention a cylindrical drilling tool is obtained, by means of which especially deep holes (of a depth of three feet and more) may be drilled in one course of work, without causing any disturbances in automatically disposing of the cuttings produced by the drilling process. This is essentially attained by so constructing the grooves serving for disposing of the cuttings, that their volume will gradually increase from the point of the drill towards the other end thereof, that is towards the shaft of the drill holder. For this purpose the ordinarily employed helical grooves which serve for carrying off the cuttings produced by the drilling process are provided with especial ribs for safely guiding the drill, said ribs being further provided, if desired, with a backed off cutting edge so as to act as a reamer. These grooves are furthermore sub-divided so as to form empty spaces and guiding grooves proper, which serve for guiding the cuttings and which are of a cross-section enlarging towards the end of the rear end of the drilling tool. By such an arrangement the guiding grooves for the cuttings are so limited, that the cuttings which are separated from the bottom of the boring will be deflected by said guiding ribs towards above and carried to the annular space which is limited by the shaft of the holder being of smaller cross-section and by the wall of the boring, so that the cuttings may freely discharge from the boring after being drilled. The enlargement of the groove serving for disposing of the cuttings is known in disc-shaped drilling tools.

According to this invention the empty spaces which are positioned intermediate the grooves serving for guiding the cuttings, are utilized for conveying a cooling or lubricating agent to the cutting edges of the drilling tool by having said spaces in communication with the longitudinal channels which are usually provided in drilling tools. By means of such lateral branches of the channels the lubricating agent is supplied to the cutting edges of the drilling tool, until the boring is fully completed. In this way the drilling will be prevented from running dry during its operation, such as is the case after the bottom of the boring is removed by the drilling tool thus opening the orifices of the longitudinal lubricating channels so that the lubricating agent may freely discharge therefrom.

In the drawing there is represented an example of a drilling tool according to this invention, Fig. 1 showing the drilling tool with a piece of the tool holder, broken-away, Fig. 2 being a plan view taken on Fig. 1, Fig. 3 a top view of the drilling tool as seen from its point, Fig. 4 a section according to line A—B of Fig. 2, Fig. 5 a section according to line C—D of Fig. 2 and Fig. 6 showing the drill holder as seen from its working surface, which contacts with the bottom of the boring to be drilled.

In the construction as shown in the drawing, the drilling tool is provided with two ribs $a$, which form the limiting walls of a helically wound groove for carrying off the cuttings. These ribs $a$ may also be arranged obliquely or in another suitable way. Cutting edges or surfaces $f$ are provided at the ends of the ribs $a$ so that the latter may be designated also as cutting ribs. Intermediate these cutting ribs $a$ there are provided guiding ribs $b$ which may be positioned parallelly to the axis of the drilling tool or also arranged in helical form and these ribs combine with the ribs $b$ to form clearance chambers. The angular position of these guiding ribs $b$ relatively to the cutting ribs $a$ may be choosen as desired.

The grooves serving for carrying off the chips or cuttings produced by the drilling tool are limited by the cutting and guiding ribs in such a manner, that their cross-section will be steadily increasing from the point of the drilling tool towards the tool holder. By this a jamming of the cuttings in the boring will be avoided and an easy and quick discharge of the cuttings will be facilitated.

The cutting and guiding edges of the drilling tool may be positioned perpendicularly to the axis of the drilling tool or at any desired angle. In case of drilling tools of larger diameter the cutting edges $f$ are provided with chip breaking grooves. The cutting edges of the drilling tool as well as the cutting ribs $b$ are "backed off". The cutting ribs $a$ are provided alongside of their helically formed edge with an oblique surface $g$ serving to reduce the friction. The guiding ribs $b$ are likewise backed off so that they will simultaneously act as a guiding means and as a reamer.

The tool holder $h$ may, for instance, be detachably connected with the drilling tool by means of screw bolts $p$ extending through the head $c$ of the tool. The head $i$ of the tool holder is made to fit the cross-section of the drilling tool in such a way, that the grooves of the tool serving for carrying off the chips or cuttings are continued through the head of the tool holder. By this a clogging up of the chips or cuttings will be avoided. Recesses $k$ are provided on the front surface of the head $i$ of the tool holder and serve for receiving the stops $e$ of the drilling tool head $c$ and for positively rotating the latter.

The head $i$ of the tool holder is further provided at its front surface with a central recess serving for receiving the centering pivot $d$ of the drilling tool on the head $c$. The shaft of the tool holder $a$ is made as weak as possible, in order to provide an ample circular space around said holder permitting unobstructed discharge of the chips or cuttings.

The drilling tool is preferably of short length and made from high-speed tool steel of superior quality. The tool holder is made of a length corresponding to the depth of the boring to be drilled and may consist of steel of poorer quality. The herein described drilling tool which has the general advantage of being able to be used for drilling holes of great depth, for instance at least three feet, in one course of work and in a relatively very short time is further improved according to this invention by providing special arrangements for properly guiding the cooling agent.

The cooling and lubricating agent is carried in the usual manner as near as possible towards the point of the drilling tool. Accordingly, the drilling tool in its preferred construction, as shown in the drawing, is twice perforated, two perforations $e$ passing from the point of the tool towards the head $c$ thereof. The perforations or channels $e$ provided in the body of the tool are connected with further longitudinal channels $m$ in the body of the tool holder, the cooling and lubricating agent being passed through these channels from the point of the tool by means of a pressure pump. The means which have ordinarily been employed for conveying the cooling and lubricating liquid to or near to the point of the drill have the disadvantage, that at the moment where the bottom of the drilled hole is perforated, the orifices of the lubricating conduits or channels have been opened, thus causing the lubricating liquid to freely discharge from the drilling tool, so that the latter had to work in dry condition during perforating the bottom of the boring. By reason of this the drilling tool had been considerably heated and even been brought to glowing temperature, which rendered the tool unfit for proper operation.

According to this invention the lubrication for the tool is further improved in a very perfect manner, by providing the channels or perforations $e$ with lateral branches $q$. By means of these lateral branches the lubricating agent is conveyed to the cutting edges of the drilling tool until the bottom of the boring is fully perforated.

I claim:

1. A drilling tool having a shank smaller in diameter than that of the tool and provided with opposed pairs of cutting and guiding ribs, said cutting ribs having cutting edges at their points and also lateral cutting ridges, said guiding ribs having lateral cutting ridges which produce a reamer action and combining with said cutting ribs to form alternate clearance chambers and grooves, the latter of which are adapted for the removal of drillings, and a head for the tool forming a closure only for said clearance chambers and providing means for attachment to an operating shaft.

2. A drilling tool having a shank smaller in diameter than that of the tool and provided with opposed pairs of cutting and guiding ribs, said cutting ribs having cutting edges at their points and also lateral cutting ridges, said guiding ribs having lateral cutting ridges which produce a reamer action and combining with said cutting ribs to form alternate clearance chambers and grooves, the latter of which are adapted for the removal of drillings, and a head for the tool forming a closure only for said clearance chambers, said shank having main lubricating passages therein leading to the points of said cutting ribs, and said main passages having branch passages leading therefrom into said clearance chambers.

In testimony whereof I affix my signature.

WILHELM SASSE.